United States Patent [19]
Ozaki et al.

[11] Patent Number: 5,319,626
[45] Date of Patent: Jun. 7, 1994

[54] METHOD FOR REWRITING DEFECT MANAGEMENT AREAS ON OPTICAL DISK ACCORDING TO ECMA STANDARD

[75] Inventors: Minoru Ozaki; Kyosuke Yoshimoto, both of Amagasaki; Hiroyuki Onda, Hoya; Koji Yamana, Setagaya Ward; Takuya Nagata, Hoya; Hidehiko Murata, Niiza; Yutaka Kobayashi, Musashino, all of Japan

[73] Assignees: Mitsubishi Electric Corporation; Teac Corporation

[21] Appl. No.: 749,890

[22] Filed: Aug. 26, 1991

[30] Foreign Application Priority Data

Aug. 27, 1990 [JP] Japan .................. 2-226018

[51] Int. Cl.$^5$ .................................. G11B 7/00
[52] U.S. Cl. ................... 369/54; 369/58; 369/47; 369/48
[58] Field of Search ............. 395/575; 369/54, 58, 369/47, 48

[56] References Cited

U.S. PATENT DOCUMENTS

| | | | |
|---|---|---|---|
| 5,025,431 | 6/1991 | Naito | 369/36 |
| 5,025,432 | 6/1991 | Naito | 369/36 |
| 5,068,842 | 11/1991 | Naito | 369/32 |
| 5,075,804 | 12/1991 | Deyring | 360/49 |
| 5,111,444 | 5/1992 | Fukushima | 369/58 |
| 5,235,585 | 8/1993 | Bish et al. | 369/54 |
| 5,237,553 | 8/1993 | Fukushima et al. | 369/58 |

*Primary Examiner*—Robert W. Beausoliel, Jr.
*Assistant Examiner*—Phillip Vales
*Attorney, Agent, or Firm*—Andrus, Sceales, Starke & Sawall

[57] ABSTRACT

A method for rewriting four defect management areas on an optical disk according to an ECMA standard is performed by means of deleting an old data which has been recorded on the respective defect management areas and then sequentially writing down a new data on respective defect management areas.

4 Claims, 6 Drawing Sheets

FIG.2

| BYTE | CONTENT | MANDATORY SETTINGS ||| 
|---|---|---|---|---|
| | | FULLY R/W | PARTIALLY EMBOSSED | FULLY EMBOSSED |
| 0 | DDS IDENTIFIER | (0A) | (0A) | (0A) |
| 1 | DDS IDENTIFIER | (0A) | (0A) | (0A) |
| 2 | RESERVED | (00) | (00) | (00) |
| 3 | FULLY EMBOSSED | n.a. | n.a. | n.a. |
| 4 | DISK CERTIFIED | (01) | (0.1) | n.a. |
| 5 | DISK NOT CERTIFIED | (02) | (02) | n.a. |
| 6 | NUMBER G1 OF R/W GROUPS MSB | | | (00) |
| 7 | NUMBER G1 OF R/W GROUPS LSB | | | (00) |
| 8 | NUMBER N1 OF R/W DATA SECTORS PER GROUP MSB | | | (00) |
| 9 | NUMBER N1 OF R/W DATA SECTORS PER GROUP | | | (00) |
| 10 | NUMBER N1 OF R/W DATA SECTORS PER GROUP LSB | | | (00) |
| 11 | NUMBER M1 OF R/W SPARE SECTORS PER GROUP MSB | (00) | | (00) |
| 12 | NUMBER M1 OF R/W SPARE SECTORS PER GROUP | (00) | | (00) |
| 13 | NUMBER M1 OF R/W SPARE SECTORS PER GROUP LSB | (00) | | (00) |
| 14 | NUMBER G2 OF EMBOSSED GROUPS GROUPS MSB | (00) | | (00) |
| 15 | NUMBER G2 OF EMBOSSED GROUPS GROUPS LSB | (00) | | (00) |
| 16 | NUMBER M2 OF EMBOSSED DATA SECTORS PER GROUP MSB | | | |
| 17 | NUMBER M2 OF EMBOSSED DATA SECTORS PER GROUP | | | |
| 18 | NUMBER M2 OF EMBOSSED DATA SECTORS PER GROUP LSB | | | |
| 19 | NUMBER M2 OF EMBOSSED PARITY SECTORS PER GROUP MSB | | | |
| 20 | NUMBER M2 OF EMBOSSED PARITY SECTORS PER GROUP | | | |
| 21 | NUMBER M2 OF EMBOSSED PARITY SECTORS PER GROUP LSB | | | |
| 22 | NUMBER OF TRACKS PER PARITY SECTOR | | | |
| 23 | START OF PDL, TRACK MSB | | (01) | (01) |
| 24 | START OF PDL, TRACK | | | (FF) |
| 25 | START OF PDL, TRACK LSB | | | (FF) |
| 26 | START OF PDL, SECTOR | | | (FF) |
| 27 | START OF SDL, TRCK MSB | | | (FF) |
| 28 | START OF SDL, TRACK | | | (FF) |
| 29–511 | START OF SDL, TRACK LSB / START OF SDL, SECTOR | (00) | (00) | (FF)/(00) |

FIG. 3

| BYTE | CONTENT |
|---|---|
| 0 | (00), PDL IDENTIFIER |
| 1 | (01), PDL IDENTIFIER |
| 2 | NUMBER OF ADDRESSES IN THE PDL, MSB |
| 3 | NUMBER OF ADDRESSES IN THE PDL, LSB (IF BYTES 2 AND 3 ARE (00), BYTE 3 IS THE END OF THE PDL) |
| 4 | ADDRESS OF THE FIRST DEFECTIVE SECTOR (TRACK NUMBER, MSB) |
| 5 | ADDRESS OF THE FIRST DEFECTIVE SECTOR (TRACK NUMBER) |
| 6 | ADDRESS OF THE FIRST DEFECTIVE SECTOR (TRACK NUMBER, LSB) |
| 7 | ADDRESS OF THE FIRST DEFECTIVE SECTOR (SECTOR NUMBER) |
| X-3 | ADDRESS OF THE LAST DEFECTIVE SECTOR (TRACK NUMBER, MSB) |
| X-2 | ADDRESS OF THE LAST DEFECTIVE SECTOR (TRACK NUMBER) |
| X-1 | ADDRESS OF THE LAST DEFECTIVE SECTOR (TRACK NUMBER, LSB) |
| X | ADDRESS OF THE LAST DEFECTIVE SECTOR (SECTOR NUMBER) |

FIG. 4

| BYTE | SDL CONTENT |
|---|---|
| 0 | (00), SDL IDENTIFIER |
| 1 | (02), SDL IDENTIFIER |
| 2 | (00) |
| 3 | (01) |
| 4 | LIST LENGTH IN BYTES IN THE SDL, MSB |
| 5 | LIST LENGTH IN BYTES IN THE SDL, LSB |
| 6-7 | (THIS COUNT BEGINS AT BYTE=6) |
| 8 | (00) |
| 9 | (02) |
| 10-13 | (01) |
|  | (00) |
| 14 | NUMBER OF ENTRIES IN THE SDL, MSB |
| 15 | NUMBER OF ENTRIES IN THE SDL, LSB |
|  | (EACH ENTRY IS 8 BYTES LONG) |
| 16 | ADDRESS OF THE FIRST DEFECTIVE SECTOR (TRACK NUMBER, MSB) |
| 17 | ADDRESS OF THE FIRST DEFECTIVE SECTOR (TRACK NUMBER) |
| 18 | ADDRESS OF THE FIRST DEFECTIVE SECTOR (TRACK NUMBER) |
| 19 | ADDRESS OF THE FIRST DEFECTIVE SECTOR (TRACK NUMBER, LSB) |
| 20 | ADDRESS OF THE FIRST DEFECTIVE SECTOR (SECTOR NUMBER) |
| 21 | ADDRESS OF THE FIRST REPLACEMENT SECTOR (TRACK NUMBER, MSB) |
| 22 | ADDRESS OF THE FIRST REPLACEMENT SECTOR (TRACK NUMBER) |
| 23 | ADDRESS OF THE FIRST REPLACEMENT SECTOR (TRACK NUMBER, LSB) |
|  | ADDRESS OF THE FIRST REPLACEMENT SECTOR (SECTOR NUMBER) |
| Y-7 | ADDRESS OF THE LAST DEFECTIVE SECTOR (TRACK NUMBER, MSB) |
| Y-6 | ADDRESS OF THE LAST DEFECTIVE SECTOR (TRACK NUMBER) |
| Y-5 | ADDRESS OF THE LAST DEFECTIVE SECTOR (TRACK NUMBER) |
| Y-4 | ADDRESS OF THE LAST DEFECTIVE SECTOR (TRACK NUMBER, LSB) |
| Y-3 | ADDRESS OF THE LAST DEFECTIVE SECTOR (SECTOR NUMBER) |
| Y-2 | ADDRESS OF THE LAST REPLACEMENT SECTOR (TRACK NUMBER, MSB) |
| Y-1 | ADDRESS OF THE LAST REPLACEMENT SECTOR (TRACK NUMBER) |
| Y | ADDRESS OF THE LAST REPLACEMENT SECTOR (TRACK NUMBER, LSB) |
|  | ADDRESS OF THE LAST REPLACEMENT SECTOR (SECTOR NUMBER) |

METHOD FOR REWRITING DEFECT MANAGEMENT AREAS ON OPTICAL DISK ACCORDING TO ECMA STANDARD

BACKGROUND OF THE INVENTION

The present invention relates to a method for rewriting information written down in each of four defect management areas on an optical disk of a rewritable type, a partial ROM type, or a full ROM type according to ECMA standard, the information written down in each of the four defect management areas being substantially the same.

ANSI/X3B11/89-120 has proposed a method for managing defective sectors on a 90 mm optical disk of a rewritable type, a partial ROM type, or a full ROM type where defective sectors are arranged so that the optical disk can be made compatible with various kinds of disk storage. The ANSI standard conforms to the ECMA standard. A description will now be given of the abstract of the ECMA standard.

A data zone of a preaddressed optical disk according to the ECMA/TC31/91/32 standard comprises, as shown in FIG. 1, four defect management areas (DMA), a rewritable zone, and an embossed zone. Incidentally, the term "a data sector", as used herein, means a sector on which a user records information. The term "a spare sector", as used herein, means a spare sector for a defective sector which is discovered while an optical disk is being verified or generated while the optical disk is being used. The term "a group", as used herein, means an element which correlates the data sector with the spare sector.

Each DMA has a length of 37 sectors including all information about defective sectors and comprises a disk definition sector (DDS), a primary defect list (PDL) and a secondary defect list (SDL). The address of the first sector of the DMA 1 is given by (track 0, sector 0). The address of the first sector of the DMA 2 is given by (track 1, sector 14). The address of the first sector of the DMA 3 is given by (track 9997, sector 12). And the address of the first sector of the DMA 4 is given by (track 9998, sector 14). Incidentally, the DDS of each DMA is located at each of the above addresses. The number, corresponding to the number of predetermined defective sectors, of PDL is located subsequent to the DDS. The number, corresponding to the number of predetermined defective sectors, of SDL is located subsequent to the PDL. The term "DDS", as used herein, means a table of contents shown in FIG. 2 indicating data of defective sectors. The term "PDL", as used herein, means, as shown in FIG. 3, a list of defective sectors discovered while the optical disk is being verified or while the optical disk is being formatted. The term "SDL", as used herein, means, as shown in FIG. 4, a list of defective sectors generated while the optical disk is being used. Therefore, if a defective sector is discovered while the disk is being verified or being formatted, the DDS and PDL has to be changed. If the number of defective sectors is greater than the number of spare sectors included in the group, the DDS, PDL and SDL have to be changed. On the other hand, if a defective sector is generated while the optical disk is being used, the DDS and the SDL have to be changed. If the number of groups of the rewritable zone or the number of groups of the embossed zone is to be rewritten, only the DDS is changed. If the DDS, PDL or SDL is to be changed, each DMA instead of being partially overwritten, is rewritten as a whole. In this case, according to the conventional DMA rewriting method, the old data of the DMA 1 is first deleted by an optical head and then new data is written down thereon. The old data of the DMA 2 is deleted and then new data is written down thereon. Subsequently, the optical head is moved to the DMA 3, and the old data of the DMA 3 is deleted and then new data is written down thereon. Lastly, the old data of the DMA 4 is deleted and then new data is written down thereon. Incidentally, data concerning defective sectors to be written down in respective DMA 1 to 4 are substantially the same as each other.

However, the above conventional DMA rewriting method has the following disadvantage. That is, if the DMA is interrupted from being rewritten while the optical head is being moved from the DMA 2 to the DMA 3 because of a power failure, the defective sector data of the DMA 1 and 2 becomes different from that of the DMA 3 and 4. The optical disk consequently has some DMAs having different defective sector data.

SUMMARY OF THE INVENTION

Accordingly, it is a general object of the present invention to provide a novel and useful method for rewriting defective sector data on a disk in which the above disadvantage is eliminated.

The more specific object of the present invention is to provide a method for rewriting defect management areas on an optical disk according to ECMA standard so that the optical disk cannot have some defect management areas having defective sector data different from that of some other defect management areas.

According to the present invention, a method for rewriting data in four defect management areas on an optical disk according to an ECMA standard, a data zone of the optical disk comprising the four defect management areas, a rewritable zone, and an embossed zone, comprises the steps of memorizing a first data which has been recorded on each of the four defect management areas, a content of each such recorded first data being substantially the same as that of each other first data, memorizing a second data to be added to the first data, generating a third data based on the first data and the second data, deleting the first data in each of the four defect management areas by means of an optical head, and sequentially writing down the third data in each of the four defect management areas by means of the optical head.

According to the present invention, since the third data is written down in all four defect management areas after the first data in all four defect management areas are entirely deleted, a defect management area having the first data and a defect management area having the third data is never mixed on the optical disk.

Other object and further features of the present invention will be apparent from the following detailed description when read in conjunction with the accompanying drawings.

BRIEF DESCRIPTION OF THE DRAWINGS

FIG. 2 is a view for explaining the DDS;

FIG. 3 is a view for explaining the PDL;

FIG. 4 is a view for explaining the SDL;

DETAILED DESCRIPTION OF THE PREFERRED EMBODIMENTS

An optical disk is rewritten mainly when a defective sector is discovered while the optical disk is being verified or formatted, when a defective sector is generated while information is being recorded on the disk or reproduced therefrom, or when the number of groups of the rewritable zone or the embossed zone is to be changed.

The optical disk is verified by moving the optical head from an innermost position to an outermost position on the optical disk in accordance with a so-called "verify" program. If the optical head discovers a defective sector while the disk is being verified, the PDL and DDS are substantially changed.

The optical disk is formatted by moving the optical head from the innermost position to the outermost position on the optical disk in accordance with a format program. If the optical head discovers a defective sector while the disk is being formatted, the PDL and DDS are substantially changed.

While the optical head is recording information on the optical disk, the optical head sequentially verifies whether the information is properly recorded on each sector. If the optical head discovers a defective sector while the optical disk is being used, the SDL and DDS are substantially changed.

Incidentally, a user can always change the number of groups of the rewritable zone and those of the embossed zone. The DDS should be changed in order to change the number of groups.

Figure 1:
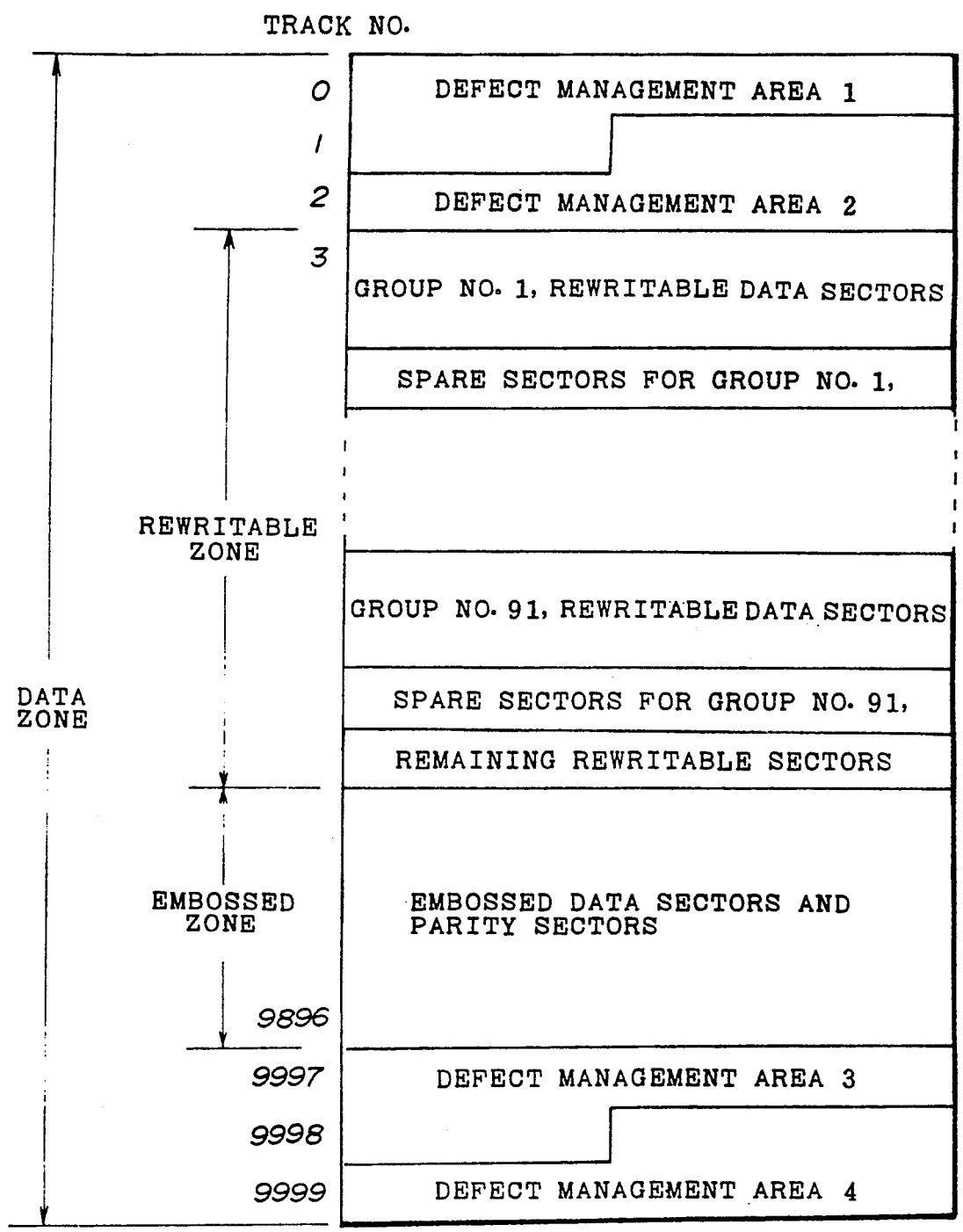
FIG. 1 is a view of the construction of a recording surface on an optical disk according to the ECMA/TC31/91/32.
Figure 5:
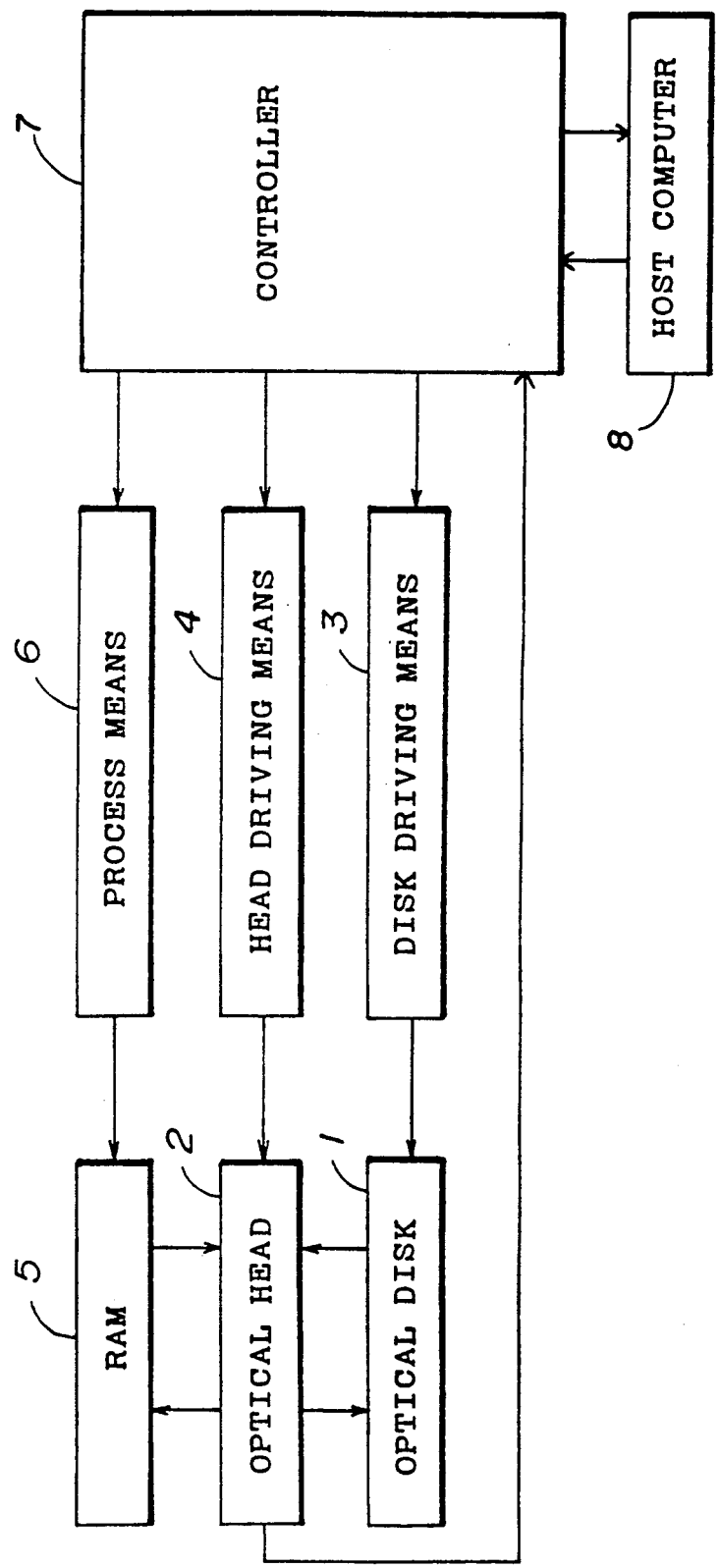
FIG. 5 is a block diagram of a disk storage to which a method according to the present invention is applied.
Figure 6:
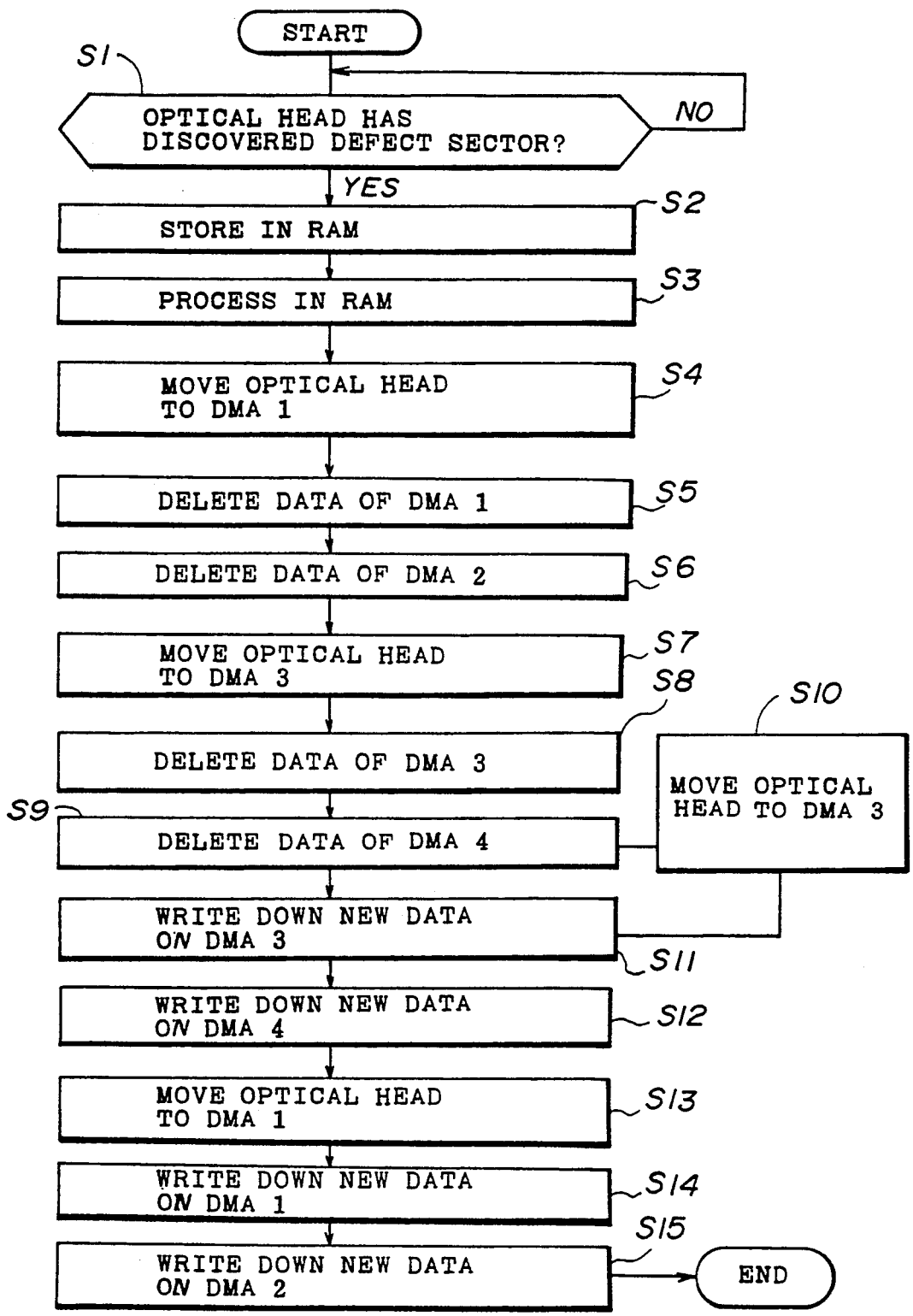
FIG. 6 is a flowchart for explaining the method according to the present invention.

A description will now be given of the DMA rewriting method according to the present invention with reference to FIGS. 5 and 6. An optical disk storage according to the present invention comprises, as shown in FIG. 5, an optical disk 1, an optical head 2, disk driving means 3, head driving means 4, a RAM 5, processing means 6, a controller 7 and a host computer 8. The optical disk 1 is respectively connected to the disk driving means. The optical head 2 is connected to the optical disk 1, head driving means 4, RAM 5 and controller 7. The RAM 5 is connected to the processing means 6. The disk driving means 3, head driving means 4 and processing means 6 are respectively connected to the controller 7. The controller 7 is connected to the host computer 8.

The optical disk 1 may be inserted into the optical disk storage and ejected therefrom. In this embodiment, a 90 mm optical disk of a partial ROM type according to the ANSI or ISO standard is used for the optical disk 1. Since the ANSI or ISO standard conforms to the ECMA/TC31/91/32 standard, the recording surface of the optical disk is preaddressed and the data zone is divided into the DMAs 1 to 4, rewritable zone, and embossed zone.

The optical head 2 performs a predetermined process for the optical disk 1 in accordance with the program executed by the host computer 8. In addition, the optical head 2 outputs the result of the process to the controller 7.

The disk driving means 3 rotates the optical disk 1 at a predetermined rotational frequency in accordance with the instructions given by the controller 7. The head driving means 4 moves the optical head 2 to a desired position in accordance with the instructions given by the controller 7.

The RAM 5 stores the present data of each DMA on the optical disk 1. The processing means 6 performs a process described later for the RAM 5, when the data stored in the RAM 5 is to be changed, so that the changed data can be compatible to the format of the DMA.

The controller 7 controls the disk driving means 3, head driving means 4 and processing means 6 in accordance with the program in the host computer 8. The host computer 8 has many programs, such as the verify program, format program, recording/reproducing program and program for changing the number of groups of the rewritable zone and the embossed zone.

A description will now be given of the operation of the optical disk storage, when the optical head 2 discovers a defective sector, to which the method according to the present invention is applied. When the optical head 2 discovers a defective sector (in step 1), data representing a position of the defective sector is stored in the RAM 5 (in step S2). The RAM 5 has already stored a previous data of each of the DMAs 1 to 4.

For example, it is assumed that the PDL did not initially exist and the optical head 2 discovers a defective sector during the format. Initially, "FF" has been respectively established at "21-24" bytes of the DDS shown in FIG. 2 and "2" and "3" bytes of the PDL shown in FIG. 3. The RAM 5 stores a previous data of each DMA at, for example, a region 1. In addition, the position data of the defective sector discovered by the optical head 2 is stored in, for example, a region 2. When the optical head 2 discovers the defective sector, it outputs a defective sector presence signal to the controller 7. In response to the defective sector presence signal, the controller 7 instructs the processing means 6 to rewrite the RAM 5. In response to the instruction given by the controller 7, the processing means 6 replaces the previous data stored in the region 1 of the RAM 5 by the defective sector data of the region 2 of the RAM 5. The previous data stored in the region 1 of the RAM 5 comprises PDL-related data included in the DDS of each DMA in the initial state and data included in the PDL of the DMA before the replacement mentioned above. processing means 6 arranges the order of the position data of the defect data. For example, when the optical head 2 discovers a defective sector during the recording period, the SDL is to be changed. In this case, it is assumed that defective sectors (track 10, sector No.10) and (track 10, sector No.30) has been initially written down in the SDL. Then, if a new defective sector (track 10, sector No.20) is discovered by the optical head 2, the processing means 6 arranges the position data of the defective sectors in the ascending order.

When the defective sector data to be rewritten is set-up in the RAM, the controller 7 moves the optical head 2 to a head position (track 0, sector No.0) of the DMA 1 via the head driving means 4 (in step S4). Subsequently, the optical head 2 sequentially deletes the data of the DMAs 1 and 2 (in step S5 and S6). Conventionally, the optical head 2, then, has written down the new defective sector data in the DMA 1 and the DMA 2. However, if a power failure occurs after the new defective sector data is written down, the optical disk 1 has DMAs having different defective sector data. Accordingly, in the method of the present invention, the optical head 2 is moved to a head position (track 9997, sector No.0) of the DMA 3 (in step S7) to sequentially delete data in the DMA 3 and DMA 4 (in step S8 and S9). Thus, even if a power failure occurs between the step S5 and the step S9, the DMAs having different defective sectors never exist on the optical disk 1.

After all the data of the DMAs is deleted, the new data stored in the RAM 5 is written down in each DMA. In this embodiment, in order to shorten a period for writing down the new data in each DMA, the optical head 2 writes down the new data in the DMA near the optical head 2. Concretely speaking, the optical head 2 is moved to the DMA 3 to sequentially write down the new data from the DMA 3 to the DMA 4 (in steps S10 to S12). Then the optical head 2 is moved to the DMA 1 to sequentially write down the new data from the DMA 1 to DMA 2 (in steps S13 to S15).

As is not the same as this embodiment, in the step S4, the optical head 2 may be moved to the DMA 3 or the DMA 4 in order to delete the old data of the DMA from the outer circumference of the optical disk 1. In addition, in the step S10, the optical head 2 may be moved to the head position (step 999B, sector No.12) of the DMA 4 to write down the new data.

If a power failure occurs after the step S12 is performed, the previous data in all of the four DMAs 1 through 4 is deleted and the new data is already written on the DMAs 3 and 4. In this case, all of the four DMAs 1 through 4 of the optical disk 2 can be recovered to a correct condition after the deletion of the previous data. That is, after the power failure recovers, the optical head 2 reads the new data from the DMAs 3 and 4 and writes such new data to the DMAs 1 and 2. On the other hand, if a power failure occurs after the step S6 is performed, the previous data in the DMAs 1 and 2 is deleted but the previous data remains in the DMAs 3 and 4. In this case, all of the four DMAs 1 through 4 can be recovered to a correct condition before the deletion of the previous data. That is, after the power failure recovers, the optical head 2 read the previous data from the DMAs 3 and 4 and writes the data to the DMAs 1 and 2. In addition, a verify program can be executed by the host computer 8 to verify the reliability of data recorded on the optical disk 1.

Incidentally, if an attempt is made to change only the DDS, the data in the RAM may be changed by the processing means 6 via the host computer 8 and the controller 7. After the data of the RAM 5 has been changed, the same process subsequent to the step S6 shown in FIG. 6 can be applied.

As mentioned above, according to the present invention, since the DMAs having the different defect data never exist on the optical disk 1, the optical disk in accordance with the ANSI or ISO standard can be provided.

Further, the present invention is not limited to these preferred embodiments, but various variations and modifications may be made without departing from the scope of the present invention.

What is claimed is:

1. A method of rewriting defective sector data in each of first through fourth defect management areas of an optical disk by means of an optical head when a defective sector is detected in the optical disk, said method comprising the steps of:
    storing first data in a first region of a memory device, said first data having been written to each of the first through fourth defect management areas of the optical disk, and the data of the four defect management areas being identical;
    storing second data in a second region of the memory device when a defective sector is detected in the optical disk, said second data including defective sector data indicating a position of said defective sector in the optical disk;
    generating third data in the memory device based on said first data in the first region of the memory device and based on said second data in the second region thereof;
    deleting said first data of all of the four defect management areas of the optical disk by means of the optical head; and
    writing said third data, generated in the memory device, to all of the first through fourth defect management areas of the optical disk by means of the optical head after said deletion of said first data of all of the four defect management areas of the optical disk.

2. A method according to claim 1, wherein in said step of writing the third data to all of the first through fourth defect management areas by means of the optical head, the third data is first written to the defect management area nearest the optical head among the four defect management areas of the optical disk.

3. A method according to claim 1, wherein said method further comprises a step of verifying the presence of a defective sector on the optical disk by means of the optical head to generate a data on a position of the defective sector as the second data, after the step of storing first data in a first region of the memory device.

4. A method according to claim 1, wherein said method further comprises a step of generating a data concerning a rewritable zone of the optical disk and an embossed zone of the optical disk to be changed to the second data, after the step of storing first data in the first region of the memory device.

* * * * *